United States Patent [19]

Winkler et al.

[11] Patent Number: 5,106,791
[45] Date of Patent: Apr. 21, 1992

[54] SINTERED MICROCRYSTALLINE CERAMIC MATERIAL

[75] Inventors: Herwig Winkler; Peter Janz, both of Klagenfurt; Georg Gottschamel, Treibach, all of Austria

[73] Assignee: Treibacher Chemische Werke Aktiengesellschaft, Treibach, Austria

[21] Appl. No.: 713,415

[22] Filed: Jun. 10, 1991

Related U.S. Application Data

[62] Division of Ser. No. 427,239, Oct. 25, 1989, Pat. No. 5,053,369.

[30] Foreign Application Priority Data

Nov. 2, 1988 [AT] Austria .................. 2695/89
Jan. 26, 1989 [AT] Austria ................... 153/89
Jul. 26, 1989 [AT] Austria .................. 1802/89

[51] Int. Cl.$^5$ .............................. C04B 35/02
[52] U.S. Cl. ............................ 501/95; 51/293; 51/304; 51/309
[58] Field of Search ............ 51/293, 304, 309; 501/95

[56] References Cited

U.S. PATENT DOCUMENTS

| | | | |
|---|---|---|---|
| 4,770,671 | 9/1988 | Monroe et al. | 51/293 |
| 4,799,938 | 1/1989 | Janz et al. | 51/293 |
| 4,838,899 | 6/1989 | Bifuk | 51/293 |
| 4,964,883 | 10/1990 | Morris et al. | 51/293 |
| 5,011,508 | 4/1991 | Wald et al. | 51/293 |
| 5,053,369 | 10/1991 | Winkler et al. | 501/95 |

FOREIGN PATENT DOCUMENTS 0293163 11/1988 European Pat. Off. .
0293164 11/1988 European Pat. Off. .

*Primary Examiner*—William R. Dixon, Jr.
*Assistant Examiner*—Willie J. Thompson
*Attorney, Agent, or Firm*—Collard, Roe & Galgano

[57] ABSTRACT

Sintered microcrystalline ceramic material based on α-Al$_2$O$_3$ with an addition of 0.01 to 2.0 weight percent of a cerium compound, consisting of a microcrystalline matrix and 0.1 to 30 volume percent whisker-like needles, whereby said cerium compound is mainly present in the needles. The whisker-like needles give this material a special tenacity combined with good abrasive results.

11 Claims, No Drawings

SINTERED MICROCRYSTALLINE CERAMIC MATERIAL

This is a divisional of copending application Ser. No. 07/427,239 filed on Oct. 25, 1989 now U.S. Pat. No. 5,053,369.

TECHNICAL FIELD

This invention refers to sintered microcrystalline ceramic material based on $\alpha$-$Al_2O_3$ with an addition of 0.01 to 2 weight percent, preferably 0.01 to 0.5 weight percent of a cerium compound.

PRIOR ART

The European Patent application EP-A 293 164 discloses a ceramic abrasive material which contains at least 0.5 weight percent of a rare earth compound. The finished abrasive material comprises a phase which consists of the reaction product of a rare earth oxide with aluminum oxide. Good abrasive results are only achieved here if the rare earth compounds are present to the extent of at least 0.5 weight percent, but preferably 1 weight percent.

In addition to this, small-grained abrasive materials are known. Thus the European Patent Specification EP 024 099 discloses microcrystalline abrasive material based on $\alpha$-$Al_2O_3$ which is produced by the sintering of aluminum oxide hydrate gel at approximately 1400° C. In order to achieve good abrasive results, the subsequent addition of at least one modifying component is necessary. As modifying component at least 10 volume percent $ZrO_2$ and/or $HfO_2$ and/or at least 1 volume percent of a spinel of $Al_2O_3$ with oxides of Co, Ni, Zn or Mg are proposed.

The European Patent application EP-A 0 152 768 discloses the effect of the addition of very fine $\alpha$-$Al_2O_3$ to aluminum oxide hydrate gel before the sintering takes place. In accordance with the above the sintering temperature can be lowered by said addition and the crystallite size of the abrasive material can be kept at a low level. If the sintering takes place for too long it might happen that undesirable coarse lath-like crystallites are produced.

The added $\alpha$-$Al_2O_3$-particles should not exceed 0.1 $\mu$m. The difficulty of producing such a fine powder which is free of coarse grains, constitutes a considerable disadvantage of this method.

Thus the U.S. Pat. No. 4,744,802 discloses iron oxide as the nucleating agent. If, however, the solubility of $Fe_2O_3$ is exceeded in $Al_2O_3$, aluminates are produced which have a lower hardness.

The European Patent application EP-A 0 263 810 (TCW) discloses microcrystalline sintered abrasive material of a high quality which does not need a nucleating agent for its production.

SUMMARY OF THE INVENTION

It is the task of the invention to produce ceramic material which can be used as abrasive material and, because of its special structure, shows special tenacity combined with good abrasive results.

This object is achieved in that the ceramic material consists of a crystalline matrix and of 0.1 to 30 volume percent, preferably of 1 to 25 volume percent, and even more preferably of 1 to 15 volume percent whisker-like needles, whereby the cerium compound is mainly contained in the needles.

In contrast to the European Patent A 0 152 768 which deems undesirable the lath-like crystallites resulting from too high sintering temperatures, it was surprisingly noticed that the whisker-like needles considerably improve the mechanic qualities of the abrasive grains whenever cerium oxide was present in reactive form at the time of the production of the needles. The diameter of the little rods lies between 0.2 and 1 $\mu$m. The length is between 1 and 10 $\mu$m. The volume percentage lies between 1 and 30 percent depending on the conditions prevailing during the production.

The $Al_2O_3$-matrix has a preferable crystallite size of less than 0.5 $\mu$m and a very homogenous structure.

Furthermore, the invention refers to a method for producing ceramic materials by mixing a highly disperse $\alpha$-aluminum oxide hydrate into a diluted acid solution, by adding a cerium compound to the amount of 0.01 to 2 weight percent, preferably 0.01 to 0.5 weight percent with regard to the $\alpha$-aluminum oxide hydrate, by drying, crushing and sintering. This method is characterized in that the suspension is deaerated and deagglomerated before drying, and that the sintering process is performed in several stages and preferably under gas pressure.

The sintering process is controlled in such a manner that next to a submicrocrystalline $Al_2O_3$-matrix, needle-shaped crystals develop.

The application of pressure during the transformation of $\delta$ via $\theta$ to $\alpha$-$Al_2O_3$ probably causes interior stresses between the various modifications of $Al_2O_3$ which causes the various crystallographic planes to grow at different speeds. As a consequence of this, anisotropic growth of the $\alpha$-$Al_2O_3$-crystals and their lath-like form occur. These stresses only occur singularily at inhomogenous locations in the structure, resulting in the characteristic structure of needles in a fine-grain matrix. With regard to its properties, the needles can be distinguished from the matrix by the content of cerium.

The stresses between the matrix and needles which occur whenever the temperature changes cause the needles to detach slightly from the matrix (micro fissures). Thus fissures reaching a needle are deflected. The stress which breaks the needles is reduced, as the needle is not firmly attached to the matrix. The holding forces, nevertheless, are fully sufficient to hold the matrix together.

The abrasive results are also improved by a self-sharpening effect. The deflection of the fissure on the needles can contribute to the formation of new sharp edges of the fracture. The size of the fragments mainly depends on the distance between the needles. For certain purposes the abrasive properties may be adjusted and optimized by varying the needle concentration (number per volume unit).

The needles are monocrystalline solid solutions of $\alpha$-$Al_2O_3$ with $CeO_2$, thereby making the material tougher and enhancing the structure. A surplus of $CeO_2$, which leads to the production of $CeO_2$-particles in large quantities, again impairs the mechanic qualities of the Al-oxide grains. Therefore, the addition of $CeO_2$ should never exceed the amount which can be absorbed by the whisker-like needles in a solid solution. Best results were achieved with amounts of $CeO_2$ below 0.5 weight percent referring to the overall content of $\alpha$-$Al_2O_3$ in the ceramic material.

Preferably, next to the addition of cerium, extremely fine particles of a nucleating agent are added to the α-aluminum oxide hydrate suspension, thereby causing an extremely fine needle structure.

Nucleating agents may be very fine α-$Al_2O_3$, Diaspor, $AlF_3$ or a precursor thereof. The nucleating agent is added up to an amount of 5 weight percent referring to the final product. It was ascertained that material produced in such a manner shows improved qualities. The reason for this probably lies in the fact that there is an increased length-to-diameter ratio of the whisker-like needles, the diameter of the needles decreases although the length remains the same, and at the same time the number of needles per volume unit increases.

An increased addition of powdered nucleating agent exceeding 5 weight percent did not bring about any improvement of the qualities. The nucleating agent can be added in such a manner that a suspension of very fine α-$Al_2O_3$-particles is added to the boehmite-suspension. Such a suspension of a nucleating agent is produced either by grinding or sedimentation of common α-$Al_2O_3$-powder or any other method which results in submicron α-$Al_2O_3$. Naturally the α-$Al_2O_3$, Diaspor, $AlF_3$ or a precursor thereof may be added in a solid form either before or after the deagglomeration.

Monovalent acids such as azotic acid, hydrochloric acid, formic acid or acetic acid may be used for the dispersion of the pseude-boehmite.

The deagglomeration can be performed in a dispersing machine in accordance with the rotor-stator principle. Also other dispersing machines such as ball mills can be used, although, however, higher amounts of abrasion of metal or from the grinding body can impair the quality of the product.

Commercially available pseudo-boehmites (Pural ®, Disperal ®, Versal ®) with a purity of over 99% and a specific surface between 180 and 290 $m^2$/g may be used as highly disperse α-aluminum oxide hydrates. The solids content of the suspension lies between 5 and 40 weight percent, preferably between 15 and 25 weight percent. Azotic acid, hydrochloric acid or acetic acid can be used as peptizing acids.

The addition of the element Ce performed during the deagglomeration in the dispersing machine is made by means of an anorganic or organic salt, which is present in form of an oxide after the sintering. Also, submicron powder free of coarse grains made from an oxide or a hydroxide of Ce may be applied. The additions should be made to the amount of 0.01 to 0.5 weight percent (referring to the oxide in the final product).

Drying is performed by means of a thin-layer evaporator with an added belt dryer. Nevertheless any other drying apparatus may be used which allows thorough mixing of the product in the drying phase, so that segregation may no longer occur. This is necessary to achieve the desired homogenous distribution of the needles in the final product. The pore structure of the dried material which is formed here seems to promote the formation of the needles, as considerably less needles develop when the material is dried statically. The dried material is crushed and screened. The grain resulting from this can either be directly sintered to abrasive grain or, in a certain fine form, be pressed as a powder by means of organic binding agents into formed parts. All known pressing methods such as matrix, extruding or rolling presses are suitable therefor.

The dried and pressed material is subsequently sintered. The sintering takes place in four stages. First, both the remaining water and the acid components are expelled at 500°-800° C., and, at the same time, the transformation of the Ce salt into the oxide is performed. In the second stage the pressure is increased to 50-100 bar at approx. 800° C. until the transformation into α-$Al_2O_3$ is completed—which takes approx. 1 hour—, whereby the temperature may not exceed a maximum of 1100° C. Before closed pores develop, the pressure must be lowered, as otherwise the compressed gases would be locked into the pores which would lead to an obstruction of the dense sintering.

In the third stage the elimination of the majority of the open pores takes place. This is made without any pressure at a temperature of 1000° C.-1300° C. In the fourth stage the material is sintered under pressure. The gas pressure in the furnace is increased from 1 to a maximum of 100 bar. The temperature can be increased to 1400° C. if this is necessary. The second stage of the gas pressure sintering will preferably take place at a temperature between 1250°-1350° C. The sintering periods depend on the temperature and lie within some minutes to a maximum of 3 hours per stage. For the purpose of maintaining the fine crystallinity it is more preferable to sinter for a longer period at low temperatures than to sinter for a short period at higher temperatures. The four-stage sintering process may be performed in any suitable furnace, but experience has shown that it is advantageous if the first stage is performed in a specially lined furnace, as acid exhaust gases develop here.

The material in accordance with the invention is especially suitable for abrasive purposes, but it may nevertheless be used for any kind of application in the field of aluminum oxide ceramics. When used in abrasive disks it has shown to be advantageous if the material was crushed before the sintering, when used in belts or flexible disks, crushing after sintering was more preferable.

EXAMPLES

Example 1

Production of the Suspension 10 kg of α-aluminum oxide monohydrate sold under the trade name of Disperal ® were continuosly fed to a solution of 39.5 kg of water and 440 g of concentrated azotic acid. The suspension was then deaerated in a laboratory vacuum deaerator at 100 mbar and subsequently pumped through a dispersing machine with two feeder openings. The flow speed was 3 l/h and the speed of the rotor was around 15000 rpm. The second feeder opening of the dispersing machine was fed a with solution of 61.4 g/l of cerium nitrate hexahydrate with 270 ml/h. The deagglomerated suspension was then further processed. The sintered final product from this suspension contained 1 weight percent of $CeO_2$.

Example 2

The suspension of example 1 was condensed whilst being stirred and after coagulation said suspension was dried in poly-propylene cups in a forced air oven at 80° C. for 36 hours resulting in brittle slabs. The dried slabs were then crushed to grains in a hammer mill and subsequently screened in a screening machine (content of fine grains <0.1 mm—see also example 3). The grains were then calcined for one hour at 600° C. in a muffle furnace. Subsequently the material was heated to 900° C. in a gas pressure sintering furnace. After increasing the pressure to 100 bar, the temperature was increased to 1100° C. within an hour, and then the pressure was decreased to 1 bar and the temperature was further increased to 1300° C. After another 1.5 h at 1300° C., the final sintering was made for 15 min at 100 bar. The material had 3 volume percent porosity and contained next to the $CeO_2$-particles with a size of 100–500 nm approx. 20 volume percent needles with a diameter of 0.2–0.5 μm and a length between 3 and 5 μm.

Example 3

Dried fine grains (<0.1 mm) of example 2 were mixed with approx. 20–25 weight percent $H_2O$ and pressed into cylinders (30 mm φ, 5 mm length). The pressing took place uniaxially in a matrix at 400 MPa. The cylinder was sintered in the same manner as in example 2. The sintered material had 2 volume percent porosity and practically showed the same microstructure with needles as the material of example 2. The sintered cylinders were crushed to grains and screened.

Example 4

The cylinders pressed according to example 3 were crushed and screened before sintering. The screened grains were sintered in accordance with example 2.

Example 5

The α-aluminum oxide monohydrate suspension was produced in accordance with example 1. The metered addition of a cerium nitrate solution contained 6.2 g/l cerium nitrate hexahydrate, so that the final product contained 0.1 weight percent $CeO_2$. The deagglomerated suspension was used for examples 6 to 8.

Example 6

The suspension of example 5 was further processed in accordance with example 2 (drying and sintering). The material produced in such a manner had 2 volume percent pores and contained next to a few $CeO_2$-particles 15 volume percent needles with a diameter between 0.4 and 0.7 μm and lengths between 6 and 10 μm.

Example 7

The dried very fine grains of example 6 were pressed into cylinders in accordance with example 3 and said cylinders were subsequently sintered, crushed and screened.

Example 8

Pressed cylinders of example 7 were crushed and screened before sintering. The screened grains were sintered in accordance with example 2.

Example 9

The α-aluminum oxide monohydrate suspension was produced in accordance with example 1. The metered addition of a cerium nitrate solution contained 24.8 g/l cerium nitrate hexahydrate, so that the final product contained 0.4 weight percent $CeO_2$.

Example 10

In accordance with example 2, the suspension of example 9 was dried, crushed to grains, screened and calcined at 600° C. Subsequently the grains were heated to 800° C. in a gas pressure sintering furnace. After increasing the pressure to approx. 90 bar, the temperature was increased within an hour to 1150° C. Then the pressure was reduced to 1 bar and the temperature increased to 1350° C. After a further hour at 1350° C., the final sintering was made for 30 min at 100 bar. The material had 2 volume percent pores and contained next to $CeO_2$-particles 25 volume percent needles with a diameter of between 0.2 and 0.5 μm and lengths between 5 and 9 μm.

Example 11

The dried fine grains of example 10 were pressed into cylinders in accordance with example 3 and sintered in accordance with example 10. After the sintering the cylinders were crushed to grains and screened.

Example 12

The pressed cylinders of example 11 were crushed and screened before sintering. The screened grains were sintered in accordance with example 10.

Example 13

The suspension of example 9 was dried statically in poly-propylene cups at 80° C. The dried slabs were further processed in accordance with example 10. The sintered product contained 10 volume percent needles. The porosity was 2.5 volume percent. The little rods were unevenly distributed.

Example 14

Without Addition of Ce

The suspension of example 1 was dried statically in in poly-propylene cups in a forced air oven at 80° C. for 36 hours resulting in brittle slabs. The dried slabs were then crushed to grains in a hammer mill and subsequently screened in a screening machine. Then the grains were calcined for one hour at 500° C. in a muffle furnace and, after that, sintered in a gas pressure sintering furnace at 1300° C. for 2 hours at 1 bar. The final sintering operation was made for 15 min at 100 bar. The material had 2 volume percent porosity and the crystallite size of the α-$Al_2O_3$ was 0.3–0.5 μm. No needles were ascertained.

Example 15

The suspension of example 1 was spray dried and pressed into cylinders (300 mm diameter, 5 mm length). The pressing took place uniaxially in a matrix at 400 MPa. The cylinders were subsequently calcined in a muffle furnace at 500° C. for 1 hour and then sintered under gas pressure in accordance with example 14. The sintered material had 1 volume percent porosity and the crystallite size of the α-$Al_2O_3$-crystalls was below 0.3 μm. The sintered cylinders were crushed to grains and screened.

Example 16

The pressed cylinders of example 15 were crushed to grains and screened before sintering. Subsequently the grains were sintered in accordance with example 14.

Example 17

In accordance with example 2, only that the crushing and screening were performed after the sintering.

Example 18

In accordance with example 6, only that the crushing and screening were performed after the sintering.

Example 19

In accordance with example 10, only that the crushing and screening were performed after the sintering.

Example 20

In accordance with example 13, only that the crushing and screening were preformed after the sintering.

The abrasive materials produced in accordance with the inventive method were processed into abrasive belts and disks, and the efficiency of the material was determined in a comparative series of tests against carbon steel C 45. In said tests the abrasive performance in comparison with the material of the Austrian Application No. 15A 2695/88 (=100) was determined. The results obtained hereby are stated in the tables and clearly show the excellent abrasive qualities of the materials produced in accordance with the invention.

TABLE 1

Abrasive performance of the belts = Total abrasion up to the decrease of the abrasion speed to 10%

| Material | Abrasion |
| --- | --- |
| Example 3 | 220 |
| Example 7 | 170 |
| Example 11 | 250 |
| Example 15 | 100 |
| Example 17 | 210 |
| Example 18 | 150 |
| Example 19 | 240 |
| Example 20 | 180 |

TABLE 2

Abrasive performance of the disks - Ratio of material abrasion to wear of the disk

| Material | Abrasion |
| --- | --- |
| Example 2 | 220 |
| Example 4 | 225 |
| Example 6 | 150 |
| Example 8 | 185 |
| Example 10 | 240 |
| Example 12 | 260 |
| Example 13 | 180 |
| Example 14 | 76 |
| Example 16 | 100 |

TABLE 3

Qualities of the abrasive material

| Example | Ce Weight per. | Pores Vol. per. | Needles $\phi \times 1$ ($\mu$m) | Vol. per. |
| --- | --- | --- | --- | --- |
| 2 | 1 | 3 | 0,3 × 4 | ≈20 |
| 3 | 1 | 2 | 0,3 × 4 | ≈20 |
| 4 | 1 | 2 | 0,3 × 4 | ≈20 |
| 6 | 0,1 | 2 | 0,5 × 8 | ≈15 |
| 7 | 0,1 | 1 | 0,5 × 8 | ≈15 |
| 8 | 0,1 | 1 | 0,5 × 8 | ≈15 |
| 10 | 0,4 | 2 | 0,3 × 6 | ≈25 |
| 11 | 0,4 | 1 | 0,3 × 6 | ≈25 |
| 12 | 0,4 | 1 | 0,3 × 6 | ≈25 |
| 13 | 0,4 | 2,5 | 0,4 × 6 | ≈10 (dried statically) |
| 14 | — | 2 | — | AT Appl. 2695/88 B.2 |
| 15 | — | 1 | — | AT Appl. 2695/88 B.3 |
| 16 | — | 1 | — | AT Appl. 2695/88 B.7 |
| 17 | 1 | 3 | 0,3 × 4 | ≈20 |
| 18 | 0,1 | 2 | 0,5 × 8 | ≈10 |
| 19 | 0,4 | 2 | 0,3 × 6 | ≈25 |
| 20 | 0,4 | 2,5 | 0,4 × 6 | ≈20 (dried statically) |

Based on the following examples, preferable arrangements of the invention shall be outlined in detail.

Production of a Nucleating Agent

A suspension of 6.5 kg water and 3.5 kg Bayer-alumina with 105 g concentrated azotic acid were ground in a ball triturator and stirrer until the median of the grain size distribution was 0.6 μm (determined by means of a sedigraph). The suspension was diluted (from 35 weight percent $Al_2O_3$ to 20 weight percent) and was freed of all particles >0.2 μm by sedimentation. The resulting fine suspension contained 2 weight percent $\alpha$-$Al_2O_3$ and was used as nucleating agent.

Example 21

29.5 kg of water, 500 g concentrated azotic acid and 10 kg of α-aluminum oxide monohydrate (Disperal ®) were mixed into 10 kg of a suspension of nucleating agent. This suspension was deaerated in a vacuum deaerator at 100 mbar and subsequently pumped through a dispersing machine with two feed openings. The flow speed was 3 l/h, the revolving speed was around 15000 rpm. A solution of cerium nitrate hexahydrate of 6.2 g/l was pumped through the second feed opening of the dispersing machine at 270 ml/h. The deagglomerated suspension was evaporated whilst being stirred and after coagulation in poly-propylene cups was dried for 36 hours at 80° C. in a forced air oven. The dried slabs were crushed to grains in a ball mill and subsequently screened in a screening machine. Then the grains were calcined in a muffel furnace at 600° C. The material was subsequently heated in a gas sintering furnace to 900° C. After increasing the pressure to approx. 100 bar, the temperature was increased within an hour to 1100° C. and subsequently the pressure was reduced (to 1 bar) and the temperature further increased to 1300° C. After about 1.5 hours at a temperature of 1300° C., the final sintering took place for 15 minutes at 100 bar. The material had 1 volume percent porosity and contained 0.1 weight percent $CeO_2$. The needle content was 15 volume percent.

Example 22

The same suspension in accordance with example 22 was produced with the difference that the metered amount of Ce was 24.8 g/l cerium nitrate hexahydrate. The suspension was dried in the same manner as in example 1, crushed to grains, screened and sintered. The product contained 0.4 weight percent $CeO_2$, 1 volume percent pores and approx. 30 volume percent needles.

Example 23

The screened grains of example 22 were sintered in a muffel furnace for two hours at 1350° C. The porosity was 2 volume percent and the grain contained approx. 20 volume percent of needles.

Example 24

Dried fine grain (<0.1 mm) of example 22 was mixed with approx. 20 weight percent water and pressed into cylinders (30 mm $\phi$, 5 mm length) uniaxially in a matrix at 400 MPa. The pressed cylinders were crushed and screened before sintering. The screened grains were sintered in a manner described in example 21. The sintered material had 1 volume percent porosity and approx. 30 volume percent whisker-like needles.

Example 25

The suspension was produced in the same manner as described in example 21, the deagglomeration, however, took place in a ball triturator and stirrer, whereby the fed solution of cerium nitrate contained 24.8 g/l cerium nitrate hexahydrate. The abrasion from the grinding body was approx. 0.1 weight percent (referring to the pseudo-boehmite). The suspension was dried in accordance with example 1, crushed to grains, screened and sintered. The final product contained 0.4 weight percent $CeO_2$ and approx. 30 volume percent needles.

Example 26

19.5 kg water, 0.5 kg concentrated azotic acid and 10 kg α-aluminum oxide monohydrate (Disperal ®) were mixed into 20 kg suspension of a nucleating agent. The suspension was deaerated, deagglomerated, and the metered solution of cerium nitrate contained 24.8 g/l cerium nitrate hexahydrate. The suspension was dried, crushed, screened and sintered in the same manner as described in example 21. The product contained 0.4 weight percent $CeO_2$, had a porosity of 2 volume percent and consisted approx. of 25 volume percent needles.

Example 27

The suspension was produced in the same manner as in example 21, deaerated and deagglomerated. The metered solution of cerium nitrate contained 61.4 g/l cerium nitrate hexahydrate. The suspension was then further processed in accordance with example 21. The sintered product contained 1 weight percent $CeO_2$ and had 2.5 volume percent pores. 20 volume percent needles were ascertained.

Example 28

Without Nucleating Agent 500 g of concentrated azotic acid and 10 kg of α-aluminum oxide monohydrate (Disperal ®) were mixed into 39.5 kg water. The suspension was deaerated and deagglomerated. The metered solution of cerium nitrate contained 24.8 g/l cerium nitrate hexahydrate. The suspension was further processed in accordance with example 21. The product contained 0.4 weight percent $CeO_2$ and 2 volume percent pores. The content of needles was approx. 20 volume percent.

Example 29

34.5 kg water, 500 g concentrated azotic acid and 10 kg α-aluminum oxide monohydrate were mixed into a 5 kg suspension of nucleating agent. The suspension was deaerated and deagglomerated in the same manner as in example 21. The metered cerium nitrate solution, however, contained 2.5 g/l cerium nitrate hexahydrate. The suspension was dried, crushed and screened. The grains were sintered in accordance with example 21. The material contained 0.04 weight percent $CeO_2$ and had 1 volume percent porosity. The content of needles was approx. 2 volume percent.

Example 30

The suspension was produced in the same manner as example 9 describes. The metered solution of cerium nitrate contained, however, 1.3 g/l cerium nitrate hexahydrate. The suspension was dried, crushed and screened in accordance with example 21. The grains were sintered in a muffel furnace at 1350° C. for 2 hours. The product contained 0.02 weight percent $CeO_2$ and had 1 volume percent of pores, the needle content was 0.5 volume percent.

The ceramic materials produced in accordance with the inventive method were processed into abrasive disks and the abrasive performance of said disks was determined referring to carbon steel C45.

| Abrasive performance of the discs Ratio of material abrasion to wear of disks | | |
|---|---|---|
| Material | $CeO_2$ Weight per. | Abrasive performance |
| Example 21 | 0.1 | 120 |
| Example 22 | 0.4 | 150 |
| Example 23 | 0.4 | 120 |
| Example 24 | 0.4 | 180 |
| Example 25 | 0.4 | 150 |
| Example 26 | 0.4 | 160 |
| Example 27 | 1.0 | 130 |
| Example 28 | 0.4 | 100 |
| Example 29 | 0.04 | 85 |
| Example 30 | 0.02 | 70 |

In the known manner abrasive material on surfaces were produced from the ceramic materials according to the invention. This resulted in respective abrasive results in abrasive belts and paper.

We claim:

1. Method for producing a ceramic material comprising the steps of mixing a highly disperse α-aluminum oxide monohydrate into a diluted acid solution, adding a cerium compound to the amount of 0.01 to 2 weight percent (calculated from $CeO_2$) referring to the aluminum oxide content, deareating and deagglomerating the suspension, drying, crushing and sintering, whereby the sintering process is performed in several stages partially under gas pressure.

2. Method for producing a ceramic material comprising the steps of mixing a highly disperse α-aluminum oxide monohydrate into a diluted acid solution, adding a cerium compound to the amount of 0.1 to 0.5 weight percent (calculated from $CeO_2$) referring to the aluminum oxide content, deareating and deagglomerating the suspension, drying, crushing and sintering, whereby the sintering process is performed in several stages partially under gas pressure.

3. Method for producing a ceramic material comprising the steps of mixing a highly disperse α-aluminum oxide monohydrate into a diluted acid solution, adding very fine particles of a nucleating agent or precursor thereof and adding a cerium compound to the amount of 0.01 to 2 weight percent (calculated from $CeO_2$) referring to the aluminum oxide content, deaerating and deagglomerating the suspension, drying, crushing and sintering, whereby the sintering process is performed in several stages partially under gas pressure.

4. Method according to claim 1, wherein the sintering process is performed in four stages at temperatures between 500° C. and 1400° C.

5. Method according to claim 4, wherein the sintering takes place in stage two and four at a gas pressure of 1 to 1000 bar during a period of 5 minutes to a maximum of 3 hours, whereby the temperature in the first stage is between 800° C. and 1150° C. and in the fourth stage between 1250° C. and 1400° C.

6. Method according to claim 5, wherein the sintering is performed in stage two and four at a gas pressure between 50 and 100 bar.

7. Method according to claim 1, wherein the solids content lies between 5 and 40 weight percent.

8. Method according to claim 1, wherein the solids content lies between 15 and 25 weight percent.

9. Method of use of a sintered microcrystalline ceramic material made by the process of claim 1 as abrasive material, ceramic cutting material and other purposes of α-aluminum oxide ceramics.

10. Method of use of a sintered microcrystalline ceramic material made by the process of claim 2 as abrasive material, ceramic cutting material and other purposes of α-aluminum oxide ceramics.

11. Method of use of a sintered microcrystalline ceramic material made by the process of claim 3 as abrasive material, ceramic cutting material and other purposes of α-aluminum oxide ceramics.

* * * * *